Oct. 21, 1947.　　　　M. ESSL　　　　2,429,410
CONNECTING ROD
Filed Nov. 27, 1943
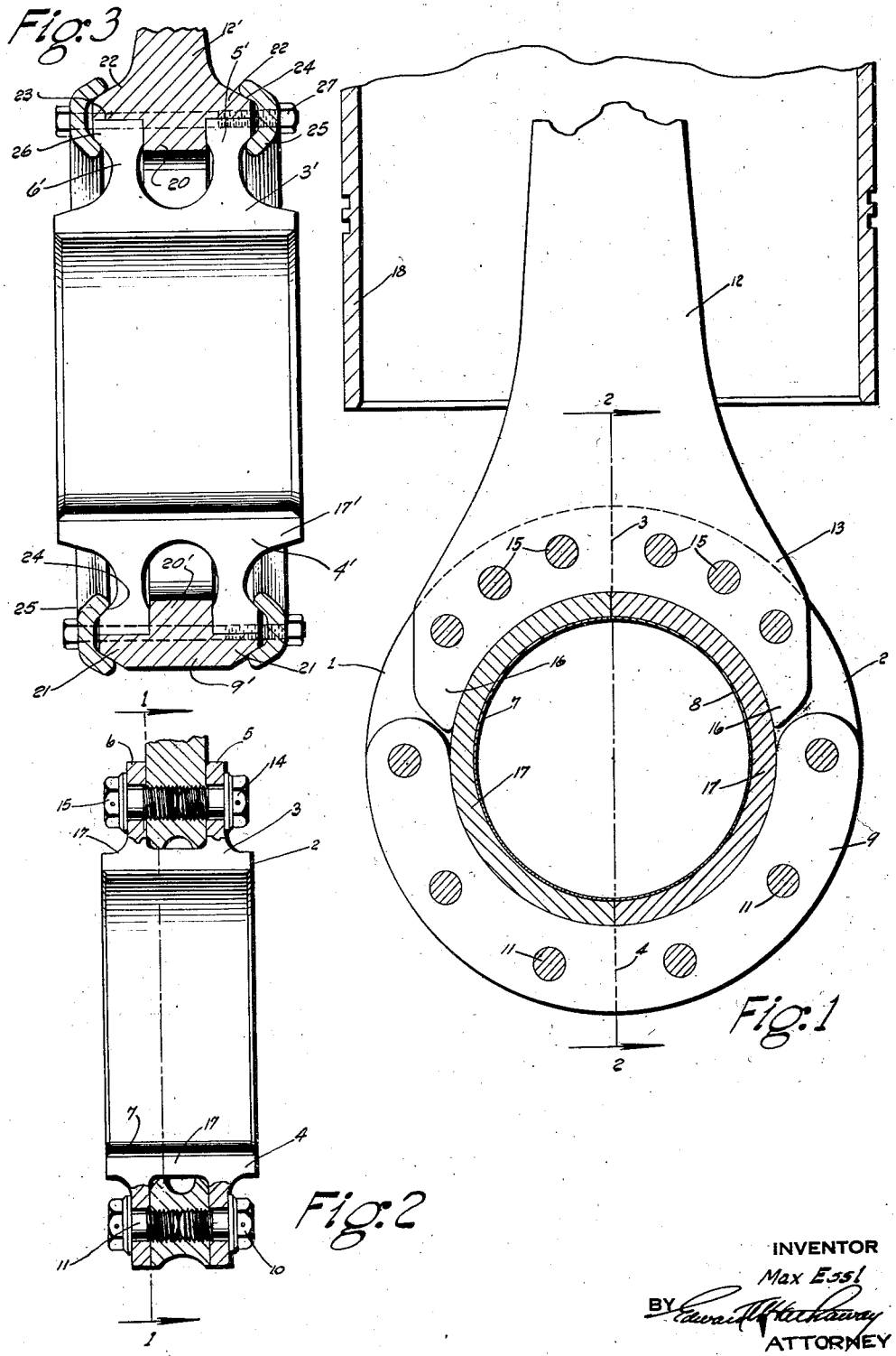
INVENTOR
Max Essl
BY
ATTORNEY Patented Oct. 21, 1947

2,429,410

UNITED STATES PATENT OFFICE 2,429,410

CONNECTING ROD

Max Essl, Swarthmore, Pa., assignor to The Baldwin Locomotive Works, a corporation of Pennsylvania Application November 27, 1943, Serial No. 512,031

6 Claims. (Cl. 308—23)

This invention relates generally to connecting rods such as internal combustion engines and more particularly to a built-up crank pin bearing box of the rod.

It is an object of my invention to provide an improved connecting rod in which the crank pin bearing box may be of large size, in fact, so large that it is not possible or practical to remove it through the cylinder liner, but nevertheless is so constructed and arranged that the main section of the connecting rod may be easily lifted through the cylinder liner while the component parts of the bearing box are removed separately.

As a result of my improved combination of connecting rod elements, I am able to assemble and check the connecting rod bearing with the crankshaft before assembly of the crankshaft in the engine; increase the stiffness of the crank pin end of the rod and bearing combination; to eliminate connecting rod bolts and crush fit of the bearing, it being understood that in prior art removable bearings a crush fit is required in order to assure body contact between the outside diameter of the bearing shell and the inside diameter of the rod bore. This crush—or interference—fit means that the rod which is machined round will not be perfectly round after the bearing shell is inserted and the bolts tightened. The degree of out-of-roundness becomes greater if the rod is of weaker design, such as is the case when a large crank pin is used and the rod is small in order to remove it through the cylinder liner. I not only overcome these functional difficulties, but at the same time produce a rod of lower cost and of simpler forging design and eliminate or minimize deflection in the assembled rod. As a result of the stiffer design, it is possible to carry more specific bearing loads which in turn permit a narrower rod. This, taken with the fact that my improved combination permits larger crank pins, allows a very desirable form of connecting rod to be made.

Other objects and advantages may be more apparent to those skilled in the art from the following description of the accompanying drawing in which:

Fig. 1 is a partial sectional view taken substantially on the line 1—1 of Fig. 2 and showing the relation of the size of the connecting rod to a cylinder liner;

Fig. 2 is a fragmentary section taken substantially on the line 2—2 of Fig. 1 with parts broken away to show the manner in which the bolts hold the component parts together; and Fig. 3 is a sectional view similar to Fig. 2 but showing a modified arrangement for holding the component parts together.

In the drawing I have shown my improved connecting rod in relation to an engine cylinder liner alone, while the other engine elements such as the frame, piston, crank case, etc., are omitted. The crank pin box of my improved connecting rod comprises two bearing halves 1 and 2 having mating surfaces which abut against each other along vertical dividing lines 3 and 4 extending diametrically of the bearing axis. As shown in Fig. 2, each bearing half has a pair of radial bosses 5 and 6 which specifically are in the form of axially spaced annular flanges. These two halves contain bearing linings 7 and 8 which are similarly formed in two halves which meet along the diametrical lines 3 and 4. These two bearing halves are held together at their lower portion by a semicircular member 9 which snugly fits in the space between the flanges 5 and 6, it being noted in Fig. 1 that this member 9 extends equally across the two split bearing halves 1 and 2 so that stud bolts such as 10 and 11 extending through suitable openings in the annular spaces between flanges 5 and 6 may securely hold the two bearing halves and member 9 together as a single unit. The connecting rod proper 12, provided in my improved combination with a relatively narrow flared lower end 13 is also received in the space between the upper portion of the annular flanges 5 and 6. This flared end 13 is preferably divided equally over the two bearing halves 1 and 2 so that studs 14 and 15 may be screwed into the flared end to firmly connect together the upper bearing halves 1 and 2.

As a result of my improved structure it is seen that the lower flared end 13 of the connecting rod may be of sufficiently narrow width to permit its ready passage through the cylinder liner 18 during removal or insertion of the rod, and yet when the rod is completely assembled an extremely rigid rod assembly is provided. The tapered end 13 extends downwardly as at 16 close to the lower connecting member 9, both of which have a firm supporting contact with the whole cylindrical portion of base 17 of the two halves 1 and 2.

The cooperative relationship of the component parts of my connecting rod allows a large crank pin bearing box to be used and at the same time the connecting rod is able to pass upwardly through the cylinder liner while the bearing box remains associated with the crankshaft if desired. The parts cooperate to insure maximum rigidity when the bearing and connecting rod are assembled inasmuch as any tendency for distortion of the element 9 or of the flared end 13 of the connecting rod will immediately tend to bring the two bearing halves 1 and 2 more tightly together along their parting surfaces 3 and 4.

The desirable results of the arrangement of Figs. 1 and 2 are obtained in the modification of Fig. 3 along with additional advantages of simplicity of construction. In this figure the bearing shell 17' is divided into two halves split preferably vertically along mating surfaces 3' and 4'. The bearing shells, as in the preferred form, have spaced annular flanges 5' and 6'. The connecting rod 12' has a semi-circular enlarged lower end similar to 13 but provided with a circular tongue or ridge 20 projecting inwardly between the annular flanges 5' and 6'. A lower semi-circular member 9', similar to member 9 of the preferred form, also has a semi-annular flange 20' projecting inwardly between the annular flanges. The member 9' and the enlarged lower end of the connecting rod extend axially as at 21 and 22 and are provided with semi-circular surfaces 23 seating upon complementary surfaces formed on the flanges 5' and 6' of the two bearing shells. Also, the outer surfaces of the flanged portions 21 and 22 are provided with tapered surfaces such as 24 whereby keeper members 25 and 26 having complementary tapered recesses may be forced by bolts 27 into tight contact with these various members to draw the same radially into engagement with the seating surfaces such as 23 as well as to hold the parts axially. Each of the keeper rings 25 may be complete circular units whereby they would be threaded so-to-speak over the crankshaft and crank arms to their proper location on the crankshaft. On the other hand, these rings may be split in half with the split extending at right angles to the vertical split 3', 4' of the bearing shells 17'.

It will of course, be understood that various changes in details of construction and arrangement of parts may be made by those skilled in the art without departing from the spirit of the invention as set forth in the appended claims.

I claim:

1. A connecting rod comprising, in combination, a plurality of mated bearing sections having radial flanges, a connecting member extending across portions of both mated bearing sections, a connecting rod shank having its lower end extending across other portions of both mated bearing sections, and means for immovably securing said lower end and said connecting member to said flanges thereby to form a rigid connecting rod and bearing unit.

2. The combination set forth in claim 1 further characterized in that said radial flanges comprise axially spaced annular flanges and said connecting member and connecting rod lower end are received in the space between said annular flanges, and the means for securing said flanges directly to the connecting member and connecting rod shaft includes bolts extending axially through the flanges.

3. A connecting rod comprising, in combination, a plurality of mated bearing sections having radial flanges, a connecting member extending across portions of said mated bearing sections and secured to the flanges thereof, a connecting rod shank having its lower end extending across other portions of said mated bearing sections and secured to the flanges thereof, thereby to form a rigid connecting rod and bearing unit, the plurality of mated bearing sections comprising two bearing halves mated along diametrical surfaces at the top and bottom of the connecting rod structure, and said connecting member and connecting rod lower end having semi-circular recesses in which the bearing halves are received.

4. A connecting rod comprising, in combination, a plurality of mated bearing sections having radial flanges, a connecting member extending across portions of said mated bearing sections and secured to the flanges thereof, a connecting rod shank having its lower end extending across other portions of said mated bearing sections and secured to the flanges thereof, thereby to form a rigid connecting rod and bearing unit, the plurality of mated bearing sections comprising two bearing halves mated along diametrical surfaces at the top and bottom of the connecting rod structure, and said connecting member being of substantially semi-circular form extending substantially half way around both of said bearing halves at their lower side and the lower end of the connecting rod being sufficiently enlarged to extend across substantial portions of the upper half of said bearing sections.

5. A connecting rod comprising, in combination, a plurality of mated bearing sections having radial flanges, connecting means extending over portions of said mated bearing sections, means for immovably securing said connecting means to the flanges of each of said bearing sections, a connecting rod shank having its lower end extending over other portions of said mated bearing sections, and means for also immovably securing said lower end to the flanges of each of said bearing sections, thereby to form a rigid connecting rod and bearing unit.

6. A connecting rod comprising a plurality of bearing sections having flanges, means for holding portions of said sections immovably together by a clamping force extending in a direction axially of the bearing sections, a connecting rod shank, and means for also holding said shank and the remaining portions of the sections immovably together by a clamping force in said axial direction thereby maintaining the original geometric cylindrical form of the bearing sections.

MAX ESSL.

REFERENCES CITED

The following references are of record in the file of this patent:

UNITED STATES PATENTS

| Number | Name | Date |
|---|---|---|
| 1,669,268 | Swoyer | May 8, 1928 |
| 1,717,873 | Brush | June 18, 1929 |
| 1,927,768 | Birkigt | Sept. 19, 1933 |
| 2,156,774 | Vincent | May 2, 1939 |

FOREIGN PATENTS

| Number | Country | Date |
|---|---|---|
| 433,983 | Great Britain | 1935 |
| 446,728 | Great Britain | May 5, 1936 |
| 539,874 | Great Britain | Sept. 26, 1941 |
| 364,217 | Italy | Oct. 25, 1938 |